United States Patent [19]

Clemens

[11] Patent Number: 5,285,439
[45] Date of Patent: Feb. 8, 1994

[54] HIGH DENSITY CED DATA STORAGE

[75] Inventor: Jon K. Clemens, San Carlos, Calif.

[73] Assignee: New Vision Technologies, Inc., Bloomington, Minn.

[21] Appl. No.: 894,813

[22] Filed: Jun. 8, 1992

[51] Int. Cl.$^5$ .............................................. G11B 9/06
[52] U.S. Cl. ..................................... 369/126; 369/132
[58] Field of Search ............... 369/126, 127, 129, 130, 369/132

[56] References Cited

U.S. PATENT DOCUMENTS 4,516,232  5/1985  Van Raalte et al. ................. 369/126

*Primary Examiner*—Paul M. Dzierzynski
*Assistant Examiner*—Don Wong
*Attorney, Agent, or Firm*—Burns, Doane, Swecker & Mathis

[57] ABSTRACT

M-ary angle modulation is used to record digital data at high density on a disk. In one embodiment, data symbols are encoded by assigning each data symbol a phase representation in terms of a carrier signal, the disk is physically altered in such a manner as to represent the carrier signal, and, at defined intervals, a phase angle of the carrier signal is changed by one of M of possible phase increments, where M equals two to the power of a number of data bits in a data symbol. M data bits are therefore recorded per each of the defined intervals. In another embodiment, a frequency of the carrier signal is changed to have one of M possible frequencies.

22 Claims, 2 Drawing Sheets

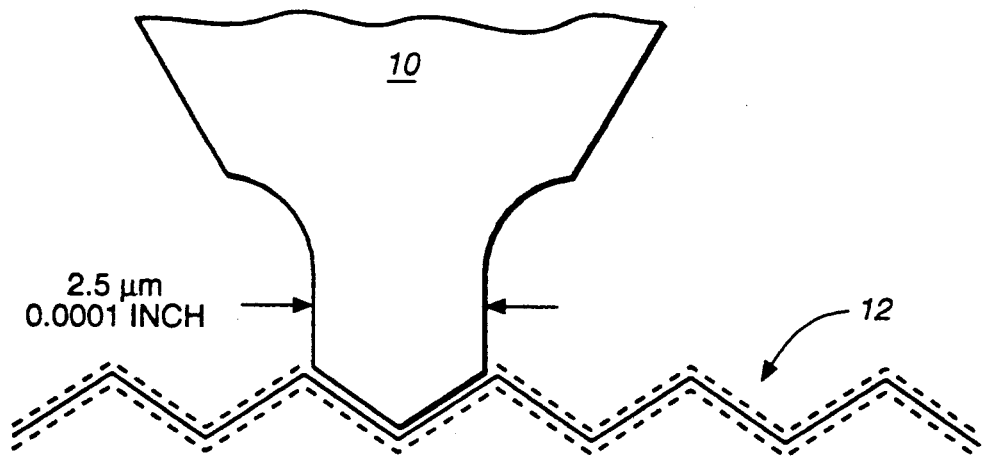
FIG._1
(PRIOR ART)
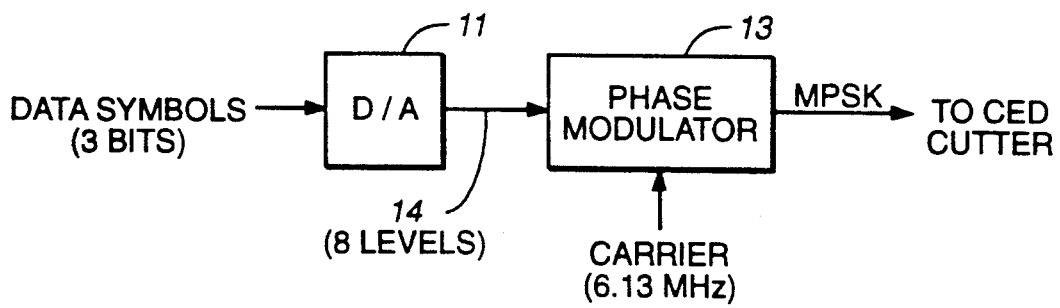
FIG._2

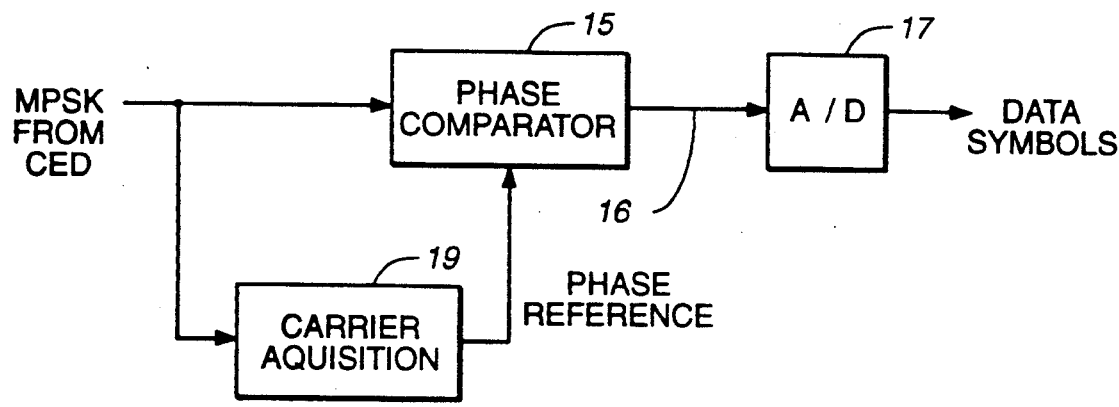
FIG._3
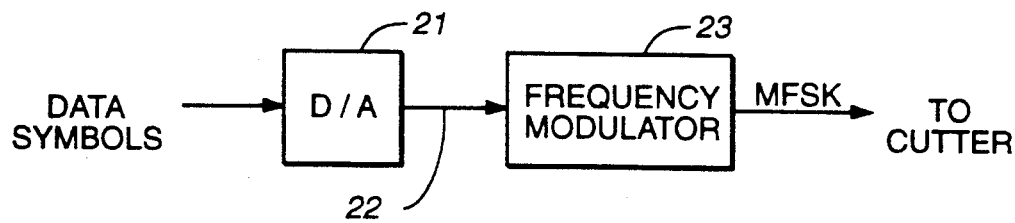
FIG._4
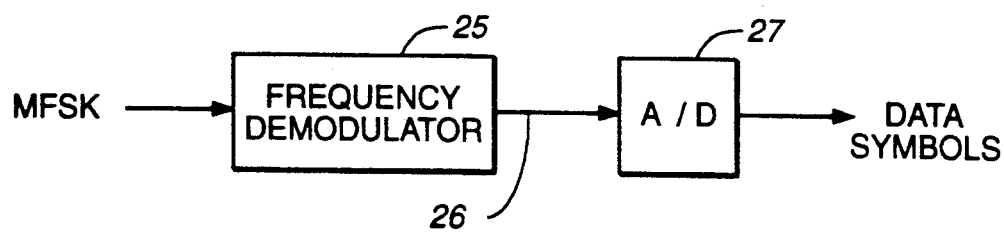
FIG._5

HIGH DENSITY CED DATA STORAGE

BACKGROUND OF THE INVENTION

1. Field of the Invention

The present invention relates to the storage of digital data and more particularly to high density storage of digital data using a capacitive electronic disc (CED).

2. State of the Art

In the early 1980's, RCA commercialized a relatively low-cost video disc system using capacitance pick up technology to detect video and audio signals placed in grooves on a capacitive electronic disc (CED). Although the CED bears a superficial similarity to a vinyl LP record in that the signal information is placed in grooves, striking differences distinguish the CED from an audio disk. For example, whereas a typical audio disk has a groove width of approximately 0.004 inches, a CED has a groove width of approximately 0.0001 inches such that 40 video disc grooves may be accommodated in the same space as a single audio disk groove. A relatively simple stylus contacts the video disc surface and tracks in the grooves, picking up capacitance variations associated with sub-micron features in the grooves. More particularly, video and audio carriers are FM-modulated and placed on the disc by varying the depth of the groove with the carrier signals. Because of the very small size of the groove (only 2.5 $\mu$m wide), the modulation of the groove depth is also necessarily very small, approximately 850 Å peak-to-peak maximum for video. In FIG. 1, modulation of the groove depth of a CED 12 is represented by dashed lines. FIG. 1 represents a radial cross section of the CED. A stylus 10 is shown tracking in a groove in contact with the disc surface.

The length of the stylus 10 is several times greater than the longest recorded wavelength on the video disc. Therefore, as the stylus travels over the modulation in the groove, its vertical position remains constant. A thin metalized electrode is placed on the trailing surface of the stylus and acts as one plate of a "capacitor" formed by the electrode and the surface of the video disc. The video disc is made of a conductive plastic and acts as the other plate of the capacitor. As the disc rotates, the distance between the bottom edge of the stylus electrode and the modulation in the groove varies as a function of the modulation. The distance between the plates of the capacitor therefore varies at the frequency of the modulation, changing the capacitance between the stylus and the disc.

The video signal recorded on the disc is a frequency-modulated 5 MHz video carrier. A black level of the video signal is represented by a frequency of 5 MHz, and a white level is represented by deviation of the video carrier signal to 6.3 MHz. Furthermore, synchronization signals cause the video carrier frequency to deviate to 4.3 MHz.

In the RCA VideoDisc system, the vertical blanking intervals of each field are aligned radially on the disc. Recorded on the disc during each vertical blanking interval is a DAXI (digital auxiliary information) code used to uniquely identify each field in a video program. Using "stylus kicker" coils, the stylus may be caused to skip between grooves of the video disc to provide rapid access and visual search modes of operation.

Despite the VideoDisc system's convenience of operation and technical superiority in terms of signal quality, the introduction of VCRs featuring full-function recording by the user prevented the Video disc system from achieving commercial success. Production of the RCA VideoDisc system continued for only a few years.

The RCA VideoDisc recording/playback signaling channel has been thoroughly studied as detailed in the following references:

1) "Capacitive Pickup and the Buried Subcarrier Encoding System for the RCA VideoDisc", J. K. Clemens, RCA Review, Mar. 1978, Vol. 39, No. 1, p. 33.
2) "The Influence of Carrier-to-Noise Ratio and Stylus Life on the RCA VideoDisc System Parameters", M. D. Ross, J. K. Clemens, and R. C. Palmer, RCA Review, Sep. 1981, Vol. 42, No. 3, p. 394.
3) "An Analysis of the Signal and Noise Transfer Properties of Capacitive Styli for the RCA VideoDisc System", J. J. Gibson, Technical Report PRRL-85-TR-017, David Sarnoff Research Center.

The channel can be described as signal plus white Gaussian noise, but with non-linearities. The signal is nonlinear in amplitude and has a linear roll off at shorter wavelengths, which is accentuated when the stylus is lifted off the surface. In addition, there is a small fixed phase shift that can vary under stylus displacement. There is also a small amount of multiplicative noise. Since the additive white Gaussian noise dominates the perturbations of the signal, however, the signal system must be chosen correctly to optimize the final signal-to-noise ratio in the presence of the non-linearities. An angle modulation system, FM, was chosen and optimized for the VideoDisc system.

There will always be a market demand for increasing the volume of random access information available in the portable or mobile computing environment, or as part of the solution to high density packaging constraints in stationary equipment. The present invention enables realization of digital data density that is superior to that available today, and offers the potential to advance beyond the theoretical limit of other systems.

The present invention capitalizes on existing technology in analog capacitive video disc recording (CED) by developing new techniques to provide digital data storage having theoretical storage density that is unsurpassed by all other disk media including optical and magnetic technology. The capacitive disc technology provides a combination of benefits including high density data storage and rapid access.

SUMMARY OF THE INVENTION

According to the present invention, M-ary angle modulation is used to record digital data at high density on a disk. In one embodiment, data symbols are encoded by assigning each data symbol a phase representation in terms of a carrier signal, the disk is physically altered in such a manner as to represent the carrier signal, and, at defined intervals, a phase angle of the carrier signal is changed by one of M of possible phase increments, where M equals two to the power of a number of data bits in a data symbol. M data bits are therefore recorded per each of the defined intervals. In another embodiment, a frequency of the carrier signal is changed to have one of M possible frequencies.

BRIEF DESCRIPTION OF THE DRAWINGS

The present invention can be further understood with reference to the following description in conjunction with the appended drawings. In the drawings:

FIG. 1 is a cross sectional view of a capacitive electronic disc and stylus according to the prior art;

FIG. 2 is a block diagram of a recording apparatus for recording digital data at high densities on a capacitive electronic disc using MPSK;

FIG. 3 is a block diagram of a playback apparatus corresponding the recording apparatus of FIG. 2;

FIG. 4 is a block diagram of a recording apparatus for recording digital data at high density on a capacitive electronic disc using MFSK; and FIG. 5 is a playback apparatus corresponding to the recording apparatus of FIG. 4.

DETAILED DESCRIPTION OF THE PREFERRED EMBODIMENTS

The RCA VideoDisc was designed for analog signalling and uses an FM signal produced by frequency modulating a carrier signal according to the video signal. To obtain higher recording densities and hence higher data rates, the FM signaling system must be replaced by a signalling system designed for the transmission of digital data. In other words, the recording/playback channel must be optimized for digital data transmission.

As in the analog RCA VideoDisc system, the digital signalling system must be chosen to be tolerant of the channel disturbances, particularly additive Gaussian noise, the amplitude non-linearity, and roll off with frequency. Angle modulation techniques provide substantial tolerance of the foregoing channel disturbances as demonstrated in the case of the analog VideoDisc system. A particularly good choice of modulation technique for digital signals is PSK (phase shift keying).

Binary modulation, however, does not take full advantage of the CED's potential for high-density data storage. Binary modulation is just a special case of M-ary modulation in which a processor accepts k source bits at a time and instructs the modulator to produce one of an available set of $M=2^k$ waveform types. For purposes of the present digital system, M-ary phase shift keying, non-differential (MPSK) and differential (MDPSK), are particularly suitable modulation choices.

Because plastic media disc systems, such as CD and CED systems, have noise, drop outs, and media defects, error correction is required. The present CED system is designed to achieve the same basic error rate of $10^{-5}$ as CD systems in order to take advantage of the well-established error correction process used in CD systems. This type of error correction is called Reed-Solonian coding, which is a block code. In addition, the codes are interleaved to correct for burst errors and drop outs due to major defects in the disc surface. The resulting code is called Cross-Interleaved Reed-Solonian (CIRC) coding. As used in CD systems, CIRC improves a basic error rate of $10^{-5}$ to an error rate of $10^{-9}$. In the CD ROM system, an additional block coding known as ECC decreases the error rate even further. All of the coding systems together in the CD-ROM system reduce the error rate to $10^{-12}$.

MPSK is often used in digital radio systems and in satellite systems and is well-studied. To achieve a given bit error rate at a given frequency, the higher the value of M, the higher the required carrier/noise (CIN) ratio of the channel must be. In slightly different terms, given a CIN ratio, the lower the desired bit error rate, the lower the value of M must be. In order to assure a final error rate at least as low as that of CD systems, the present system is designed to have a basic bit error rate of $10^{-6}$, a factor of ten better than basic error rate in CD systems.

Analysis of the RCA VideoDisc system has shown the CIN ratio of the system to be approximately 50 dB in a 30 KHz test bandwidth, although C/N can be as low as 45 dB for some choices of system parameters at the innermost radius of the disk. The CIN ratio is reduced by 22 dB across the wider signal bandwidth. The available C/N for a 5 MHz symbol frequency is therefore 23 dB to 28 dB. Calculations of the required C/N ratio for MPSK are widely available in the communications literature. One such source is J. G. Proakis, "Digital Communications", McGraw-Hill, 1983. As shown therein, to achieve a bit error rate of $10^{-6}$, the required C/N ratio is 19 dB for an M of 8 and 24 dB for an M of 16. Practical systems typically perform 2 dB or more worse than theoretical systems. Furthermore, to provide for the possible use of MDPSK to simplify signalling, additional noise margin may be required. Choosing $M=8$ gives a margin of 4 dB to 9 dB depending on the choice of system parameters.

In a preferred embodiment, the high data rate CED digital signalling system of the present invention uses MPSK with $M=8$ (3 bits per symbol). The symbol frequency is 6.13 MHz resulting in a bit rate of 18.39 Mbits/s. Allowing for 25% assumed overhead for error detection and correction, the corrected data rate is therefore 13.8 Mbits/s. In the 6.13 MHz bandwidth the theoretical required C/N is 19 dB, equivalent to 42 dB in a 30 KHz bandwidth. System parameters are chosen to allow a margin of 3 dB to 6 dB for practical detectors.

Referring now to FIG. 2, in order to produce MPSK signals for recording digital data at high density on a CED, data symbols (3 bits in length in a preferred embodiment) are input to a D/A converter 11 to produce a signal 14 having M different levels (8 in a preferred embodiment). Signal 14 is then input to a phase modulator 13 which has as another input thereof a carrier signal (6.13 MHz in a preferred embodiment). The phase modulator 13 causes each cycle of the carrier signal to be phase shifted by an amount corresponding to a level of the signal 14 designating the instant data symbol. The resulting MPSK signal is then fed to a CED cutter, known in the art.

Referring to FIG. 3, to recover the data symbols from off the CED, an MPSK signal produced by a capacitive pickup of the type shown in FIG. 1 is input to a carrier acquisition block 19 and a phase comparator 15. The carrier acquisition block 19 produces a phase reference signal, which is then input the phase comparator 15. Based on the phase reference signal, the phase comparator 15 determines the phase of each cycle of the carrier signal recorded on the CED and produces a signal 16 having M levels. The signal 16 is input to a A/D converter 17, which produces the original data symbols recorded on the CED.

The playback circuit of FIG. 3 requires a carrier acquisition block 19, which increases the cost of the circuit. Alternatively, an MFSK modulation system may be used as shown in FIGS. 4 and 5. In MFSK, the basic frequency of a carrier signal is deviated to one of M different frequencies to denote one of M different symbols. In FIG. 4, the data symbols are input to a D/A converter 21 to produce an M-level signal 22. The signal 22 is input to a frequency modulator 23. The frequency modulator 23 produces MFSK signals, which are sent to the CED cutter.

In FIG. 5, an MFSK signal produced by the capacitive pick up is input to a frequency demodulator 25. The frequency demodulator produces an N-level signal 26. The M-level 26 is input to a A/D converter 27, which produces the data symbols originally recorded on the CED.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiment by workers skilled in the art without departing from the scope of the present invention as defined by the following claims.

What is claimed is:

1. A method of recording digital data at high density on a disk, comprising the steps of:
    encoding data s ls by assigning each data symbol a phase representation in terms of a carrier signal;
    physically altering said disk in such a manner as to represent said carrier signal; and
    at defined intervals, changing a phase angle of said carrier signal by one of M possible phase increments, where M equals two to the power of a number of data bits in said data symbols, whereby $\log_2 M$ data bits are recorded per each of said defined intervals.

2. The method of claim 1 wherein said disk is a capacitive electronic disk and $M \geq 4$.

3. The method of claim 2 wherein said step of physically altering comprises cutting in said capacitive electronic disk grooves having a depth varying substantially sinusoidally in accordance with said carrier signal.

4. An apparatus for recording digital data at high density on a disk, comprising:
    means for encoding data symbols by assigning each data symbol a phase representation in terms of a carrier signal;
    means for physically altering said disk in such a manner as to represent said carrier signal; and
    means for changing a phase angle of said carrier signal at defined intervals by one of M possible phase increments, where M equals two to the power of a number of data bits in said data symbols, whereby $\log_2 M$ data bits are recorded per each of said defined intervals.

5. The apparatus of claim 4 wherein said disk is a capacitive electronic disk and $M \geq 4$.

6. The apparatus of claim 5 wherein said means for physically altering cuts in said capacitive electronic disk grooves having a depth varying substantially sinusoidally in accordance with said carrier signal.

7. A method of reading digital data recorded at high density on a disk comprising the steps of:
    probing a surface of said disk to produce a signal varying in accordance with sub-micron features of the surface of the disk;
    generating a reference sinusoidal signal having a reference phase angle;
    comparing a phase angle of said signal with said reference phase angle and producing a phase difference signal having one of M possible values; and
    converting said phase difference signal into data symbols, each data symbol including $\log_2 M$ data bits.

8. The method of claim 7 wherein said disk is a capacitive electronic disk and $M \geq 4$.

9. The method of claim 8 wherein said probing step comprises picking up capacitance variations associated with sub-micron features cut into grooves of said capacitive electronic disk.

10. An apparatus for reading digital data recorded at high density on a disk, comprising:
    means for probing a surface of said disk to produce a signal varying in accordance with sub-micron features of the surface of the disk;
    means for generating a reference sinusoidal signal having a reference phase angle;
    means for comparing a phase angle of said signal with said reference phase angle and for producing a phase difference signal having one of M possible values; and
    means for converting said phase difference signal into data symbols, each data symbol including $\log_2 M$ data bits.

11. The apparatus of claim 10 wherein said disk is a capacitive electronic disk and $M \geq 4$.

12. The apparatus of claim 11 wherein said means for probing picks up capacitance variations associated with sub-micron features cut into grooves of said capacitive electronic disk.

13. A method of recording digital data at high density on a disk, comprising the steps of:
    encoding data symbols by assigning each data symbol a frequency representation in terms of a carrier signal;
    physically altering said disk in such a manner as to represent said carrier signal; and
    at defined intervals, changing a frequency of said carrier signal to have one of M possible frequencies, where M equals two to the power of a number of data bits in said data symbols, whereby $\log_2 M$ data bits are recorded per each of said defined intervals.

14. The method of claim 13 wherein said disk is a capacitive electronic disk and $M \geq 4$.

15. The method of claim 13 wherein said physically altering step comprises cutting in said capacitive electronic disk grooves having a depth varying substantially sinusoidally in accordance with said carrier signal.

16. An apparatus for recording digital data at high density on a disk, comprising:
    means for encoding data symbols by assigning each data symbol a frequency representation in terms of a carrier signal;
    means for physically altering said disk in such a manner as to represent said carrier signal; and
    means for changing a frequency of said carrier signal at defined intervals to have one of M possible frequencies where M equals two to the power of a number of data bits in said data symbols, whereby $\log_2 M$ data bits are recorded for each of said defined intervals.

17. A method of reading digital data recorded at high density on a disk, comprising the steps of:
    probing a surface of the disk to produce a signal varying in accordance with sub-micron features of the surface of the disk;
    producing a signal having one of M possible values depending on a frequency of said signal; and
    converting said signal into data symbols, each data symbol including $\log_2 M$ data bits.

18. The method of claim 17 wherein said disk is a capacitive electronic disk and $M \geq 4$.

19. The method of claim 18 wherein said probing step comprises picking up capacitance variations associated with sub-micron features cut into grooves of said capacitive electronic disk.

20. An apparatus for reading digital data recorded on high density on a disk, comprising:
   means for probing a surface of said disk to produce a first signal varying in accordance with sub-micron features of the surface of the disk;
   means for producing a second signal having one of M possible values depending on a frequency of said first signal; and
   means for converting said second signal into data symbols, each data symbol including $\log_2 M$ data bits.

21. The apparatus of claim 20 wherein said disk is a capacitive electronic disk and $M \geq 4$.

22. The apparatus of claim 21 wherein said means for probing picks up capacitance variations associated with sub-micron features cut into grooves of said capacitive electronic disk.

* * * * *